3,597,433
10,11 - DIHYDRO - 5,10 - (IMINOMETHANO)-5H-DI-
BENZO[a,d]CYCLOHEPTENE AND DERIVATIVES
THEREOF
Thomas A. Dobson and Martin A. Davis, Montreal,
Quebec, Canada, assignors to Ayerst, McKenna and
Harrison Limited, Ville St. Laurent, Quebec, Canada
No Drawing. Filed Aug. 19, 1968, Ser. No. 753,723
Int. Cl. C07d 33/10
U.S. Cl. 260—286R                          5 Claims

ABSTRACT OF THE DISCLOSURE

There are disclosed herein 10,11-dihydro-5,10-(iminomethano) - 5H - dibenzo[a,d]cycloheptene and its corresponding 12-methyl, 12-ethyl, 12-propyl, 12-butyl, 12-cyclopropylmethyl, 12-benzyl, 12-phenethyl, 12-trimethoxybenzyl, 12-dimethylaminoethyl, 12-diethylaminoethyl, 12-dimethylaminopropyl, 12-diisopropylaminopropyl, 12-pyrrolidinoethyl, 12-piperidinoethyl, 12-(4'-methylpiperazinoethyl, 12-(4'-phenylpiperazinoethyl) and 12-morpholinoethyl derivatives and their hydrochloride salts, as well as the corresponding 13-ketones used as intermediates in the preparation of the above compounds. The compounds have anticonvulsant activity substantially free from ataxic side-effects, and methods for their preparation and use are also disclosed.

---

This invention relates to novel chemical compounds having useful biological properties. In particular, this invention relates to 10,11-dihydro-5,10-(iminomethano)-5H-dibenzo[a,d]cycloheptene derivatives of the following Formula I:

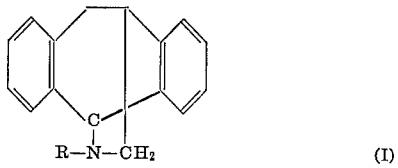

wherein the substituent R may represent hydrogen or an organic group such as, for example, a lower alkyl group containing from 1–4 carbon atoms, or a lower unsaturated alkyl group such as, for example, the alkyl group, or a lower cycloalkyl group such as, for example, the cyclopropylmethyl group, or a lower aralkyl group containing from 7–10 carbon atoms such as, for example, the benzyl, phenethyl, or trimethoxybenzyl group, or a substituted dialkylaminoalkyl group containing from 4–9 carbon atoms such as, for example, the dimethylaminoethyl, diethylaminoethyl, dimethylaminopropyl, or diisopropylaminopropyl group, or a heterocyclicalkyl group containing from 6–12 carbon atoms and from 1–2 hetero atoms such as, for example, the pyrrolidinoethyl, piperidinoethyl, 4'-methylpiperazinoethyl, 4'-phenylpiperazinoethyl, or morpholinoethyl group.

This invention also comprises the acid addition salts of the compounds of Formula I with pharmacologically acceptable acids such as, for example, sulfuric, hydrochloric, oxalic, maleic, citric, or tartaric acid.

The new and novel 10,11-dihydro-5,10(iminomethano)-5H-dibenzo[a,d]cycloheptene derivatives of this invention have been found to possess interesting pharmacological properties. More particularly, these compounds, in standard pharmacological tests, for example, in a procedure similar to that described by Swinyard et al. in J. Pharmacol. Exp. Therap. vol. 106, p. 319 (1952) for the testing of anticonvulsant agents, have exhibited utility as anticonvulsant agents. Moreover, the compounds of this invention are distinguished by being virtually free from causing ataxia, an undesirable side-effect in anticonvulsant drugs.

When the compounds of this invention are employed as anticonvulsant agents in warm-blooded animals e.g. rats alone or in combination with pharmacologically acceptable carriers, the proportion of those carriers is determined by the solubility and chemical nature of the compound, chosen route of administration and standard biological practice. For example, they may be administered orally in solid form containing such excipients as starch, milk sugar, certain types of clay and so forth. They may also be administered orally in the form of solutions or they may be used in the form of a sterile solution containing other solutes, for example, enough saline or glucose to make the solution isotonic.

The dosage of the present anticonvulsant agents will vary with the form of administration and the particular compound chosen. Furthermore, it will vary with the particular host under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects and preferably at a level that is in a range of from about 1 mg. to about 30 mg. per kilo per day, although as aforementioned variations will occur. However, a dosage level that is in the range of from about 2 mg. to about 20 mg. per kilo per day is most desirably employed in order to achieve effective results.

The compounds of this invention wherein R is as originally defined are prepared in the following manner. Thus, 10-bromo - 5H - dibenzo[a,d]cyclohepten-5-one (II) is treated with cuprous cyanide in a conventional manner to give 10-cyano-5H-dibenzo[a,d]cycloheptene-5-one (III). In its turn this compound is treated with a complex alkali metal boron hydride in a suitable solvent to give 10,11-dihydro-5,10-(epoxymethano) - 5H - dibenzo[a,d]cyclohepten-13-one (IV). In its turn this compound is treated with an aqueous solution or suspension of either ammonia or a primary amine of formula R—NH₂ wherein R is an organic group as originally defined to give a compound of Formula V wherein R is as originally defined. In its turn this compound is treated with a complex alkali metal aluminum hydride in an inert solvent to give a compound of Formula I wherein R is as originally defined.

More specifically, a mixture of 10-bromo-5H-dibenzo[a,d]cyclohepten-5-one and a molar excess of cuprous cyanide optionally diluted with quinoline is heated at a temperature within the range of 150–220° C. for a period of 0.5–3 hours. The reaction mixture is partitioned between a suitable water immisible solvent such as, for example, chloroform or methylene chloride and an aqueous mineral acid. Evaporation of the organic phase leaves 10-cyano-5H-dibenzo[a,d]cyclohepten-5-one.

In its turn a mixture of this compound and a molar excess of sodium or potassium or lithium borohydride and a solvent such as, for example, a lower alkanol containing from 1–4 carbon atoms or dimethyl sulfoxide is kept at a temperature within the range of 20–100° C. for a period of up to two days. The excess hydride is destroyed with a dilute mineral acid and 10,11-dihydro-5,10-(epoxymethano) - 5H - dibenzo[a,d]cyclohepten-13-one is thereupon isolated in a conventional manner.

In its turn, this compound is treated with either a molar excess of aqueous ammonium hydroxide or a molar excess of an aqueous solution or suspension of a primary amine of Formula R—NH₂ wherein R is an organic group as originally defined at a temperature within the range 150–230° C. for a period of between 6–24 hours to give, after removal of the excess amine, a compound of Formula II wherein R is as originally defined.

Optionally, the compound of Formula V wherein R is limited to represent hydrogen may be alkylated with an organic halide of Formula R—X wherein R is an organic group as originally defined and X represents a halogen of atomic weight greater than 19 to give a compound of Formula V wherein R is an organic group as originally defined. This alkylation is carried out in an inert solvent such as, for example, dioxane or benzene in the presence of a basic condensing agent such as for example, sodium hydride.

In their turn, the compounds of Formula V wherein R is as originally defined is treated with a molar excess of lithium aluminum hydride in an inert solvent such as, for example, ether, tetrahydrofuran, 1,2-dimethoxyethane, or dioxane at a temperature within the range of 30–100° C. for a period of between 1–18 hours, to give the compounds of Formula I wherein R is as originally defined.

Optionally, the compound of Formula I wherein R is limited to represent hydron may be alkylated with an organic halide of Formula R—X wherein R is an organic group as originally defined and X represents a halogen atom of atomic weight greater than 19 in the presence of an acid binding agent such as, for example, sodium bicarbonate or pyridine or sodium hydride in an inert solvent such as, for example, dimethyl formamide or benzene or dioxane, to give the compounds of Formula I wherein R is an organic group as originally defined.

Optionally, the compound of Formula I wherein R is limited to represent the methyl group may be prepared by treating the compound of Formula I, wherein R is limited to represent hydrogen, with a mixture of formic acid and formaldehyde in a conventional manner.

The starting material for the compounds of this invention, that is 10-bromo-5H-dibenzo[a,d]cyclohepten-5-one, is prepared as described by W. Treibs and H. J. Klinkhammer, Chem. Ber. 84, 671–9 (1951).

The following formulae, in which R is as defined above, and examples will illustrate this invention.

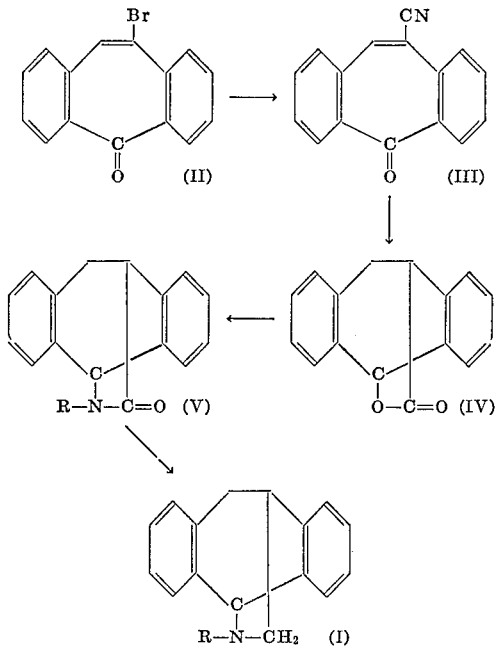

EXAMPLE 1

10-cyano-5H-dibenzo[a,d]cyclohepten-5-one

A mixture of 10-bromo-5H-dibenzo[a,d]cyclohepten-5-one (99.0 g.), cuprous cyanide (40 g.) and quinoline (200 ml.) is stirred and heated at 190–200° C. (internal temperature) for one hour. The mixture is cooled and the resulting solid mass is broken up and stirred under ether.

The mixture is filtered and the solids are washed with ether. The remaining solids are triturated under chloroform. This mixture is filtered and the solids are washed with hot chloroform. The green insoluble residue is discarded.

The ether filtrate and washings are exhaustively washed with 2 N HCl, then water, and then dried and evaporated. The chloroform filtrate and washings are similarly processed.

The solid residues so obtained are combined and recrystallized from ethanol to give the title product, M.P. 170–173° C.

The title product is further characterised by its infrared spectrum with maxima at 2230 and 1645 cm.$^{-1}$.

The title product is also obtained when the above procedure is carried out in the absence of quinoline.

EXAMPLE 2

5,10-epoxymethano-10,11-dihydro-5H-dibenzo[a,d]cyclohepten-13-one 10-cyano-5H-dibenzo[a,d]cyclohepten-5-one (5.0 g.), prepared as described in Example 1 is suspended in ethanol (80 ml.) and sodium borohydride (2.5 g.) is added. The mixture is stirred at room temperature overnight and then refluxed for two hours. The mixture is cooled, treated with 2 N HCl and evaporated to small volume. The solids are collected, washed with water and dried to give a solid (4.6 g.). This material is dissolved in chloroform (minimum volume) and chromatographed on alumina. Benzene eluted the title product which crystallized from methanol as needles, M.P. 148–150° C.

The title product is also obtained when the above procedure is followed except that dimethyl sulfoxide (20 ml.) is used in place of ethanol (80 ml.).

EXAMPLE 3

10,11-dihydro-5,10-(iminomethano)-5H-dibenzo[a,d]cyclohepten-13-one

A mixture of 5,10-(epoxymethano)-10,11-dihydro-5H-dibenzo[a,d]cyclohepten-13-one (1.2 g.) prepared as described in Example 2, and ammonium hydroxide (100 ml., d. 0.88) is heated for 7 hours at 190°.

The solid product is collected and dried and crystallized from ethanol to give the title product, M.P. 227–229° C.

EXAMPLE 4

In a similar manner to that described in Example 3, but using methylamine or ethylamine or propylamine or butylamine or allylamine or cyclopropylmethylamine or benzylamine or phenethylamine or trimethoxybenzylamine or dimethylaminoethylamine or diethylaminoethylamine or dimethylaminopropylamine or diisopropylaminopropylamine or pyrrolidinoethylamine or piperidinoethylamine or 4'-methylpiperazinoethylamine or 4'-phenylpiperazinoethylamine or morpholinoethylamine in place of ammonia, the corresponding 12-methyl-, or 12-ethyl-, or propyl-, or 12-butyl-, or 12-allyl-, or 12-cyclopropylmethyl-, or 12-benzyl-, or 12-phenethyl-, or 12-trimethoxybenzyl-, or 12-dimethylaminoethyl-, or 12-diethylaminoethyl-, or 12-dimethylaminopropyl-, or 12-diisopropylaminopropyl-, or 12-pyrrolidinoethyl-, or 12-piperidinoethyl-, or 12-(4'-methylpiperazinoethyl)-, or 12-(4'-phenylpiperazinoethyl)-, or 12-morpholinoethyl-10,11-dihydro - 5,10 - (iminomethano)-5H-dibenzo[a,d]cyclohepten-13-one is obtained.

Alternatively, a mixture of 10,11-dihydro-5,10-(iminomethano)-5H-dibenzo[a,d]cyclohepten-13-one (23.7 g.), anhydrous benzene (250 ml.) or anhydrous dioxane (250 ml.), sodium hydride (5.0 g. of a 52% suspension in mineral oil) and either methyl-, or ethyl-, or propyl-, or butyl-, or allyl-, or cyclopropylmethyl-, or benzyl-, or phenethyl-, or trimethoxybenzyl-, or dimethylaminoethyl-, or diethylaminoethyl-, or dimethylaminopropyl-, or diisopropylaminopropyl-, or pyrrolidinoethyl-, or piperidinoethyl-, or 4'-methylpiperazinoethyl-, or 4'-phenylpiperazinoethyl-, or morpholinoethyl chloride or bromide or iodide (0.12 mole) is stirred and heated under reflux for 18 hours. The mixture is evaporated to dryness and the residue is washed with water and then with pentane to leave the corresponding 12-methyl-, or 12-ethyl-, or 12-propyl-, or 12-butyl-, or 12-allyl-, or 12-cyclopropylmethyl-, or 12-benzyl-, or 12-phenethyl-, or 12-trimethoxybenzyl-, or 12-dimethylaminoethyl-, or 12-diethylaminoethyl-, or 12-dimethylaminopropyl-, or 12-diisopropylaminopropyl-, or 12-pyrrolidinoethyl-, or 12-piperidinoethyl-, or 12-(4'-methylpiperazinoethyl)-, or 12 - (4' - phenylpiperazinoethyl)-, or 12-morpholinoethyl-10,11-dihydro-5,10-(iminomethano)-5H-dibenzo[a,d]cyclohepten-13-one is obtained.

EXAMPLE 5

10,11-dihydro-5,10-(iminomethano)-5H-dibenzo[a,d]cycloheptene

A mixture of 10,11-dihydro-5,10-(iminomethano)-5H-dibenzo[a,d]cyclohepten-13-one (5.0 g.), dimethoxyethane (50 ml.) or tetrahydrofuran (50 ml.) and lithium aluminum hydride (1.5 g.) is heated under reflux for 12 hours. The mixture is treated with water, filtered, and the filtrate is evaporated to dryness. The residue is dissolved in ether and this solution is extracted with 2 N HCl. The acidic extracts are rendered alkaline and then extracted with ether. These ethereal extracts are washed with water, dried, and evaporated to leave the title product as an oil characterized by its infrared spectrum with maxima at 3000, 2910, 1487, 1445, 1050, and 910 cm.$^{-1}$.

EXAMPLE 6

10,11-dihydro-12-methyl-5,10-(iminomethano)-5H-dibenzo[a,d]cycloheptene

The title product is prepared in the same manner as described in Example 5, but using 10,11-dihydro-12-methyl - 5,10 - (iminomethano) - 5H-dibenzo[a,d]cyclohepten-13-one (5.0 g.), prepared as described in Example 4, as starting material.

The title product is obtained as an oil characterized by its infrared spectrum with maxima at 2900, 2800, 1485, 1460, 1445, 1370, 1000, and 910 cm.$^{-1}$.

The hydrochloride salt of the title product is prepared by treating the base with either methanolic or ethereal hydrogen chloride. It was crystallized from isopropanol to M.P. 245-248° C.

The title product is also obtained when a mixture of 10,11 - dihydro - 5,10-(iminomethano)-5H-dibenzo[a,d]cycloheptene (5.0 g.), prepared as described in Example 5, formic acid (10 ml.) and formaldehyde solution (10 ml.) is kept at 80° C. for 3 hours.

The title product is also obtained when a mixture of 10,11 - dihydro - 5,10 - (iminomethano)-5H-dibenzo[a,d]cycloheptene (4.4 g.), sodium bicarbonate (4.0 g.), dimethyl formamide (20 ml.) and methyl iodide (2.8 g.) is kept at 50° for 2 hours.

EXAMPLE 7

In the same manner as described in Examples 5 and 6, but using 12-ethyl-, or 12-propyl-, or 12-butyl-, or 12-cyclopropylmethyl-, or 12-benzyl-, or 12-phenethyl-, or 12-trimethoxybenzyl-, or 12-dimethylaminoethyl-, or 12-diethylaminoethyl-, or 12-dimethylaminopropyl-, or 12-diisopropylaminopropyl-, or 12-pyrrolidinoethyl-, or 12-piperidinoethyl-, or 12-(4' - methylpiperazinoethyl)-, or 12-(4'-phenylpiperazinoethyl)-, or 12-morpholinoethyl-10,11-dihydro - 5,10 - (iminomethano)-5H-dibenzo-[a,d]cyclohepten-13-one as starting material, the corresponding 12-ethyl-, or 12-propyl-, or 12-butyl-, or 12-cyclopropylmethyl-, or 12-benzyl-, or 12-phenethyl-, or 12-trimethoxybenzyl-, or 12-dimethylaminoethyl-, or 12-diethylaminoethyl-, or 12-dimethylaminopropyl-, or 12-diisopropylaminopropyl-, or 12-pyrrolidinoethyl-, or 12-piperidinoethyl-, or 12-(4'-methylpiperazinoethyl)-, or 12-(4'-phenylpiperazinoethyl)-, or 12-morpholinoethyl-10,11-dihydro - 5,10 - (iminomethano)-5H-dibenzo[a,d]cycloheptene is obtained.

The above named compounds are also respectively obtained following the procedure described in Example 6 when ethyl-, or propyl-, or butyl-, or cyclopropylmethyl-, or benzyl-, or phenethyl-, or trimethoxybenzyl-, or dimethylaminoethyl-, or diethylaminoethyl-, or dimethylaminopropyl-, or diisopropylaminopropyl-, or pyrrolidinoethyl-, or piperidinoethyl-, or 4-'methylpiperazinoethyl-, or 4'-phenylpiperazinoethyl-, or morpholinoethyl chloride or bromide or iodide is used in place of methyl iodide.

We claim:

1. A compound selected from those of the formula

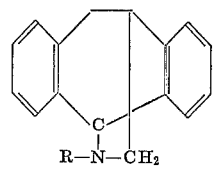

wherein R represents hydrogen, lower alkyl containing from one to four carbon atoms, allyl, cyclopropylmethyl, benzyl, phenethyl, trimethoxybenzyl, dimethylaminoethyl, diethylaminoethyl, dimethylaminopropyl, diisopropylaminopropyl, pyrrolidinoethyl, piperidinoethyl, 4'-methylpiperazinoethyl, 4' - phenylpiperazinoethyl, and morpholinoethyl; and acid addition salts thereof with pharmacologically acceptable acids.

2. The compound as described in claim 1 which is: 10,11-dihydro - 5,10 - (iminomethano)-5H-dibenzo[a,d] cycloheptene.

3. The compound as described in claim 1 which is: 10,11 - dihydro - 12 - methyl-5,10-(iminomethano)-5H-dibenzo[a,d]cycloheptene.

4. The compound as described in claim 1 which is the hydrochloride salt of 10,11-dihydro-12-methyl-5,10-(iminomethano)-5H-dibenzo[a,d]cycloheptene.

5. The process of preparing a compound of the formula

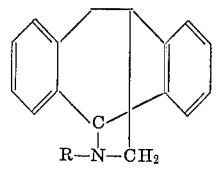

wherein R represents hydrogen, lower alkyl containing from one to four carbon atoms, allyl, cyclopropylmethyl, benzyl, phenethyl, trimethoxybenzyl, dimethylaminoethyl, diethylaminoethyl, dimethylaminopropyl, diisopropylaminopropyl, pyrrolidinoethyl, piperidinoethyl, 4'-methylpiperazinoethyl, 4' - phenylpiperazinoethyl, and morpholinoethyl, which comprises heating 10-bromo-5H-dibenzo[a,d]cyclohepten-5-one with a molar excess of cuprous cyanide and quinoline at a temperature of from 150° C.–220° C., thereby obtaining 10-cyano-5H-dibenzo-[a,d]cyclohepten-5-one and recovering said last-named compound by filtration and solvent extraction; stirring said last-named compound with a molar excess of an alkali metal borohydride in an inert solvent at 20° C.–100° C., and then adding mineral acid, thereby obtaining 10,11-dihydro-5,10-(epoxymethano) - 5H - dibenzo[a,d] cyclohepten-13-one and recovering said last-named compound by filtration; heating at 150° C.–230° C. said last-named compound with a reagent selected from the group which consists of aqueous ammonia and primary amines of formula RNH$_2$, wherein R is as above defined, thereby obtaining a compound of formula

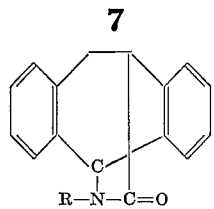

R being as above defined, removing excess amine and recovering said compound of the above formula; and then stirring said last-named compound with lithium aluminum hydride in an inert solvent at 30° C.–100° C., decomposing excess lithium aluminum hydride and recovering the said desired product by solvent extraction.

References Cited

UNITED STATES PATENTS 3,422,104   1/1969   Schroter et al. _____ 260—247.1

HARRY H. MOATZ, Primary Examiner

U.S. Cl. X.R.

260—239.3(P), 247.5(R), 268(PC), 283(R), 288(R), 289(R), 345.3, 465(R); 424—248, 250, 258